May 9, 1939.  C. G. ROSENHAUER  2,157,099
OPTICAL SYSTEM FOR STEREOSCOPIC MOTION PICTURE PRODUCTION AND PROJECTION
Filed June 1, 1935   2 Sheets—Sheet 1
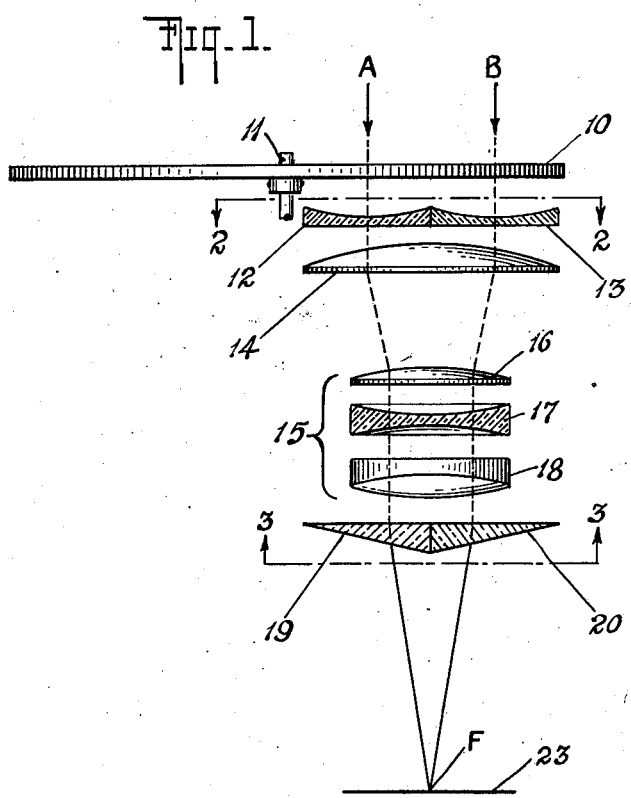
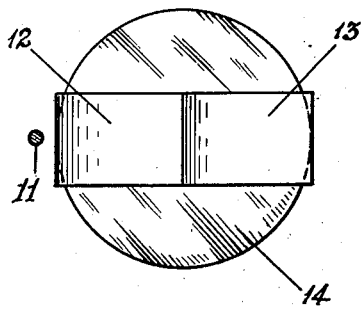
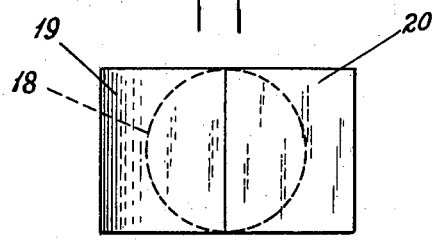
INVENTOR
CHARLES G. ROSENHAUER
BY
ATTORNEY May 9, 1939. C. G. ROSENHAUER 2,157,099
OPTICAL SYSTEM FOR STEREOSCOPIC MOTION PICTURE PRODUCTION AND PROJECTION
Filed June 1, 1935 2 Sheets-Sheet 2
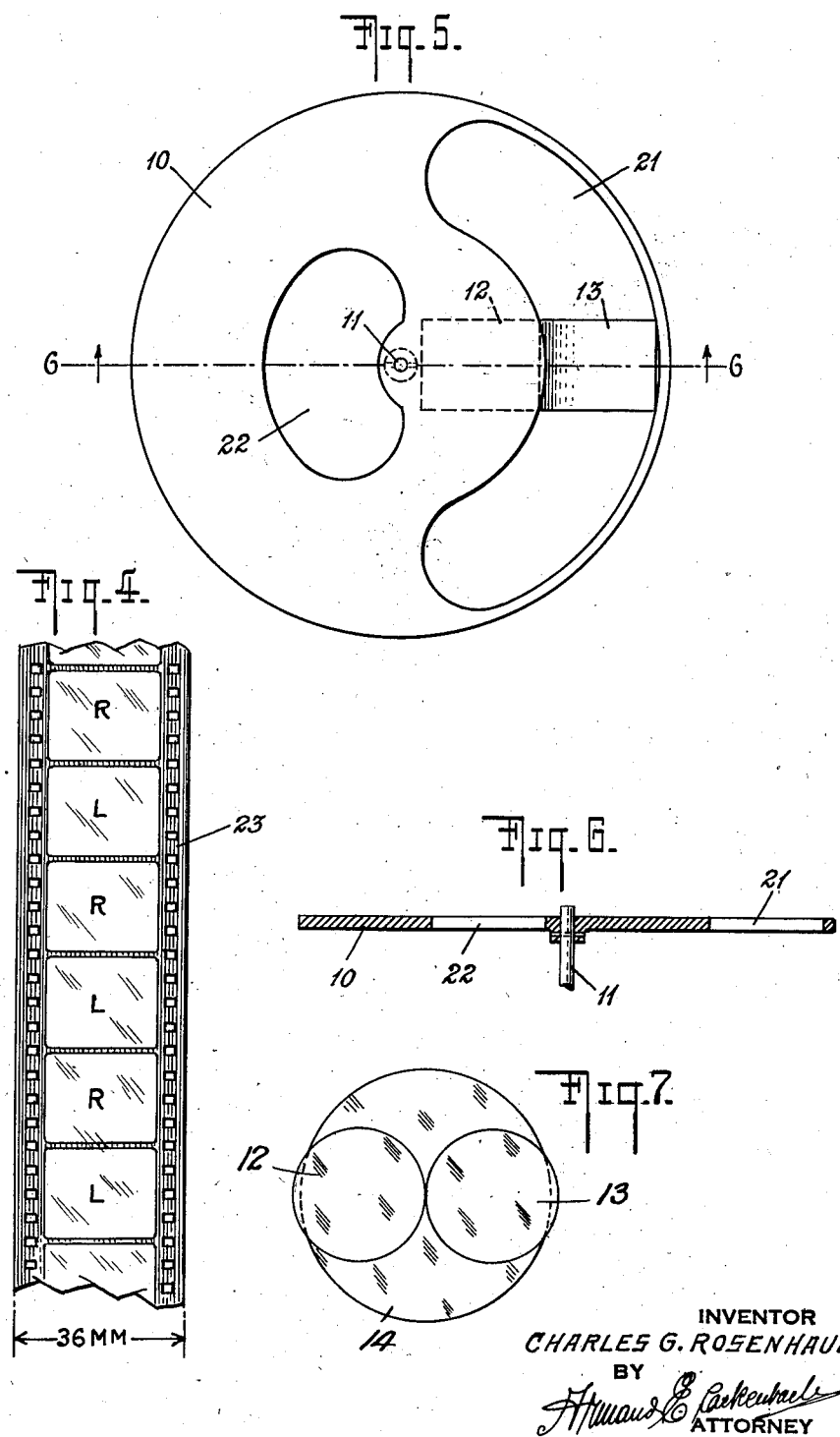
INVENTOR
CHARLES G. ROSENHAUER
BY
ATTORNEY Patented May 9, 1939

2,157,099

UNITED STATES PATENT OFFICE 2,157,099

OPTICAL SYSTEM FOR STEREOSCOPIC MOTION PICTURE PRODUCTION AND PROJECTION

Charles G. Rosenhauer, Brooklyn, N. Y., assignor of one-half to Armand E. Lackenbach, New York, N. Y.

Application June 1, 1935, Serial No. 24,466

6 Claims. (Cl. 88—16.6)

My invention relates to the art of motion picture production and projection and more particularly to a system and apparatus, involved in the production of motion pictures exhibiting, during their projection, the effect and sensation of depth and solidity; thereby accomplishing the securement of what may be termed "three dimensional" motion pictures.

One of the objects of my invention is to provide an apparatus whereby scenic effects are photographed in the course of production in alternate eye viewpoints and thereafter are projected in such alternate eye viewpoints upon a suitable screen in producing what are commonly called "stereoscopic motion pictures".

My apparatus, involving the equipment of standard motion picture cameras with elements not appreciably affecting the usual design and operation of such cameras, and the projection of the motion pictures taken by such camera being capable of exhibition with the standard projection apparatus constituting the equipment of a motion picture exhibiting establishment, the novel effects produced in accordance with my invention are the result of such apparatus.

In the development of my apparatus for carrying out my invention, I have made use of two underlying principles, the first of such principles being classified in the field of physics and optics; the other being the basic principle involved in cinematography. The first of these principles is that involved in the stereoscope, which in turn is an instrument based upon the binocular vision of human sight and in which the effect of depth and solidity is produced by viewing two planar pictures through two lenses positioned with respect to such pictures in approximately the same relationship as would be occupied by a pair of human eyes, wherein the ocular nerves induce a coalescence of the two pictures virtually superimposing one upon the other within the human brain, causing a mental union of the two images upon the retina.

The second principle constituting the basis of my invention is the now well recognized principle of persistence of vision of human sight. This principle may be briefly summarized by the statement that upon the exhibition of a picture to the sight of the human eye for as short a length of time as one one-hundredth of a second or less, the human eye will retain the picture impression for as long a period as one-third of a second after the original exhibited picture has been removed from sight.

In accordance with my invention, therefore, I produce a series of pictures upon a film, comprising consecutive pictures as they would be viewed alternately first by one eye and then as they would be viewed by the other eye. This series of pictures in accordance with my invention would then be capable of exhibition by means of the standard projection apparatus, by exhibiting such pictures alternately in the same sequence as taken during production. When such pictures are exhibited in such manner, the persistence of vision hereinabove referred to, makes possible the coalescence of alternate pictures into a single view upon the projection screen without the usually experienced flickering of the projected pictures encountered by prior art systems and apparatus. An important feature of my invention is that in the course of the exhibition of the motion pictures produced in accordance with my invention, no extraneous devices are necessary to make possible the viewing of the pictures by the audience such, for instance, as is evidenced in certain prior art methods and devices and referred to in the existing patent literature.

Among the features of my invention is a novel combination of lenses whereby the results hereinabove recited are obtained. In addition to such novel system of lenses I make use of a novel mixing shutter. The basic features of my invention, however, are not confined to the particular or similar optical combination hereinafter to be more fully described nor to the use in conjunction therewith of the novel mixing shutter, of the particular design illustrated in the accompanying drawings, but the ultimate result obtained by the use of my invention which may be specified as "projection in alternation".

Certain disadvantages of prior art methods and structures—for instance, the presence of a certain type of distortion caused by parallax, the effect of which is to produce a certain shift in the projected pictures, are reduced to a practically negligible quantity by my novel system of production and subsequent projection.

One of the primary objects of my invention, therefore, is to provide stereoscopic motion pictures in which parallax is reduced to an absolute minimum. Parallax, as the term is applied in the art of motion picture projection, is a shifting of the images projected, usually of such extent that it becomes discomforting to the human eye viewing the image, with resulting strain and fatigue. Parallax is fixed at a specific ocular distance which distance has been determined to be 65 mm. Assuming a picture to be taken of an object of specific height or length, for instance, a human being of a height of five feet, the image, when projected upon a screen is increased, in normal projection, to two or even three times normal size, the parallax increasing proportionately. Therefore, if the picture is taken at an ocular distance of 65 mm., the shift on the screen becomes 130 mm. or 195 mm., which is too great for accommodation by the human eye. While parallax must never be in excess of 65 mm. when projected on the screen, to accommodate vision, it is possible to reduce parallax below 65 mm. without destroying the illusion sought to be created, i. e. the stereoscopic effect. In accordance with my invention, therefore I provide my optical system with a pair of objective lenses tangentially disposed, if circular, or contiguous with respect to two sides, if rectangular, so that a minimum optical center for the two objectives is obtained of 20 mm. or less, thereby automatically limiting the projected parallax to 40 mm. or 60 mm., depending upon the increase in size of the projected image as compared to the normal size of the object.

In the accompanying drawings, in which a specific embodiment of my inventive concept including a specific optical system is shown by way of illustration rather than by way of limitation, Fig. 1 is a diagrammatic view in plan of an optical system and a shutter to be used in conjunction therewith, which may form the basic underlying system for carrying out my invention; Fig. 2 is a section of the optical system on the line 2—2 of Fig. 1 showing the preferred form and configuration of the pair of objective lenses and related "ray bending" lens forming a part of the optical system; Fig. 3 is a section on the line 3—3 of Fig. 1 showing a pair of prisms in bottom plan view, included in the system; Fig. 4 is a plan view of a strip of film of conventional size and configuration indicating the alternate disposition of "picture frames" as exposed on the film in accordance with my novel method of motion picture production; Fig. 5 shows, in plan view, my novel mixing shutter for use in combination with the optical system in the manner illustrated in Fig. 1; Fig. 6 is a section on the line 6—6 of Fig. 5; and Fig. 7 is a view similar to Fig. 2 but shows the objective lenses of the system as constituted of two plano-concave circular lenses tangentially disposed.

Referring more particularly to the drawings, in which similar reference characters identify similar parts in the several views, 10 designates a revolving mixing shutter mounted upon its axis 11. 12 and 13 are two negative lenses but used in the present combination as objective lenses of preferably rectangular configuration posititioned to one side of the shutter axis and placed immediately adjacent each other, the lenses having their concave faces preferably toward the shutter. These two lenses correspond with the binocular vision of the human sight, namely, in that they show two separate eye views. They are, however, not spaced at inter-purpillary distance. Immediately behind this pair of objective lenses is positioned a lens 14 of a diameter equal to the width of the two objective lenses 12 and 13. The function of lens 14 is to bend the entering rays of light A and B to the respective portions of a standard anastigmatic combination 15 constituted of a single convex lens 16, a double concave lense 17, and a plano-concave and double convex lens combination 18, or any other suitable anastigmatic combination. In the preferred embodiment of my optical system, as shown, I prefer to make use of a plano-convex lens 14.

Below, or to the rear of the anastigmatic combination 15, are positioned two wedge prisms 19 and 20 the function of which is to bend the rays of light A and B (one from each of the objective lenses 12 and 13) back to a common focal point F at which point the film is posititioned. The object of bending the light rays A and B back to a single focal point is to coordinate the two separate views with lenses 12 and 13, representing the views of the object or scene photographed as it would be viewed by the two eyes.

Positioned in front of the optical system, as shown in Fig. 1, is the rotary shutter 10 operated at half camera speed, i. e., one revolution of the shutter to each two exposures. The function of such shutter is to present alternately, first the right lens view as seen by the right eye, then the left lens view as seen by the left eye, throughout the length of the film being exposed. Individual exposures, referred to in the art as "frames", are run, in exposure as well as projection, at a speed of twenty-four (24) frames per second, it having been found by experiment that pictures, in which the motion, or passage of the pictures progressively before the eye, is at the rate of sixteen (16) or more per second, create an impression of smooth continuous motion.

The mixing shutter comprises a disc having two radial apertures 21 and 22 of different radii, i. e. at different distances from the center of rotation of the disc. The rotation of the disc will expose first one lens (of the two objectives positioned behind the shutter) and then the other, alternately, the views being registered upon the negative at the focal point F in such alternate right and left succession. When the negative is then prepared as usual, it is ready for projection of its pictures in a regular commercial projecting machine, the standard equipment in any cinema theatre.

It will be noted that by the use of a shutter of the type disclosed, one of the objective lenses 12 and 13 is always closed, while the other is open, and vice versa. Shutters similar to that shown in the accompanying drawings in having two radial apertures are known in the art, but such shutters are intended solely for projection, their design being such as to have two objective lenses simultaneously "capped" twice in each revolution of the shutter. Such shutters, being dissolving shutters, are not adapted to taking pictures as is the intended function of my novel shutter structure.

In Fig. 4 is shown a strip of film 23 of conventional size and configuration (36 mm. in width) upon which is indicated a series of picture frames representing the alternate right (R) and left (L) pictures as they are impressed upon the film in carrying out my invention.

While in the preferred optical system illustrated, I have shown the objective lenses 12 and 13 as of rectangular configuration, it is obvious that such lenses may be of the round, or circular form, so long as they are contiguously mounted in the system. The reason for the preference of rectangular lenses is the resulting decrease of parallax, the distance between the optical centers of the objectives being reduced. By the use of round objectives a cutting off of the corners of the picture frame is produced, with the obvious disadvantages.

The width of the objective lenses is preferably equal to the width of the usual picture frame, i. e. that portion of a motion picture film which has been acted upon by light and development, the lens area being directly proportional to the frame area.

While I have shown and described my invention with some degree of particularity, it is obvious that various changes and alterations can be made without departing from the spirit of my invention and from the means characterizing the generic nature thereof. The disclosure herein is therefore to be regarded as illustrative and not as limitative, of the invention.

I claim:

1. In an optical system for producing motion pictures exhibiting stereoscopic effects when projected, the combination of a pair of plano-concave contiguously disposed objective lenses through which are adapted to be passed a plurality of light beams in two groups, each group of such light beams representing two separate eye views, a single anastigmatic combination of lenses through which both of such groups of light beams are adapted to pass, and a pair of transparent prisms serving to converge said groups of light beams to a common focal point upon a film, thereby exposing the image produced by said beams upon said film at said focal point.

2. The combination claimed in claim 1 including a transparent and refractive single disc lens positioned between said objective lenses and the anastigmatic combination, said lens being effective to bend the beams of light passed through said objective lenses to the respective portions of said anastigmatic combination.

3. The combination claimed in claim 1 with a rotary shutter having two radial apertures of different radii, whereby an open registry of one of said apertures with one of said objective lenses is effected for a predetermined period of time, the other of said apertures being out of registry with the second objective lenses during the same period of time, so as to obtain a uniformly timed capping and uncapping of said lenses.

4. The combination claimed in claim 1 in which the two objective lenses are plano-concave, and have their concave sides facing the entering beams of light.

5. The combination claimed in claim 1 in which the two plano-concave objective lenses comprise two contiguously disposed lenses of substantially rectangular configuration.

6. The combination claimed in claim 1 in which the two plano-concave objective lenses comprise two lenses of substantially circular configuration tangentially disposed.

CHARLES G. ROSENHAUER.